United States Patent [19]

Takewa et al.

[11] Patent Number: 4,484,383

[45] Date of Patent: Nov. 27, 1984

[54] METHOD OF MANUFACTURING A SPEAKER DIAPHRAGM

[75] Inventors: Hiroyuki Takewa; Katsuaki Satoh; Seiichi Ishikawa, all of Osaka, Japan

[73] Assignee: Matsushita Electric Industrial Co., Ltd., Osaka, Japan

[21] Appl. No.: 390,609

[22] Filed: Jun. 21, 1982

Related U.S. Application Data

[63] Continuation-in-part of Ser. No. 149,368, May 13, 1980, abandoned.

[51] Int. Cl.3 .......... B29D 17/00; B21D 35/00

[52] U.S. Cl. .......... 29/169.5; 29/469.5; 156/197; 181/168; 181/170; 428/116

[58] Field of Search .......... 29/469.5, 169.5, 594, 29/455 L, 455 M; 156/197; 181/159, 168, 170; 428/116

[56] References Cited

U.S. PATENT DOCUMENTS

| | | | |
|---|---|---|---|
| 3,136,674 | 6/1964 | Dunkle et al. | 156/197 X |
| 3,169,251 | 2/1965 | Humes | 428/116 X |
| 3,169,898 | 2/1965 | Kazimi | 156/197 X |
| 3,658,974 | 4/1972 | Low | 428/116 X |
| 4,055,732 | 10/1977 | Yoshimura et al. | 29/594 X |
| 4,194,255 | 3/1980 | Poppe | 428/116 X |
| 4,209,162 | 6/1980 | Petiau | 428/116 X |

*Primary Examiner*—Charlie T. Moon

*Attorney, Agent, or Firm*—Pollock, Vande Sande & Priddy

[57] ABSTRACT

A multi-layer block to be developed into a disk having a honeycomb construction is initially developed into a columnar block, and then the bottom of the columnar block is radially developed for obtaining a core of a speaker diaphragm. A suitable circular thin layer is attached to the top and bottom of the core to complete a diaphragm. The columnar block may be developed by means of a cone-shaped tool into a truncated cone, and this truncated cone may be further developed into a flat disk by applying a force to the top thereof. Since the forces on development are applied to the block uniformly, the density of hexagonal sections of the honeycomb construction is uniform throughout the entire circumference of the core providing superior speaker characteristics.

1 Claim, 15 Drawing Figures

METHOD OF MANUFACTURING A SPEAKER DIAPHRAGM

This is a continuation-in-part of patent application Ser. No. 149,368, filed May 13, 1980, now abandoned.

FIELD OF THE INVENTION

This invention generally relates to a method of manufacturing a diaphragm for a loudspeaker. More particularly, the present invention relates to a method of manufacturing a speaker diaphragm which comprises a honeycomb disk obtained by developing a multi-layer block.

BACKGROUND OF THE INVENTION

When designing a loudspeaker, especially a diaphragm of a speaker, it is most important that the diaphragm has high stiffness for reproducing audio signals with high fidelity, while it is also important that the diaphragm is light in weight and has moderate internal loss for obtaining high efficiency. Recently, a disk having a honeycomb construction draws attention since such a disk may be used as a core of a diaphragm, and a diaphragm comprising such a disk has a possibility to meet the above-mentioned requirements.

The above-mentioned disk having a honeycomb construction is manufactured by developing a multi-layer block constructed by a plurality of rectangular thin layers made of aluminum, titanium or the like. Namely, a multi-layer block having a rectangular prism shape is simply developed by pulling the both sides of the block to form a round disk which includes a number of hexagonal sections or cells. However, when developing such an undeveloped multi-layer block into a disk by the above-mentioned conventional manner, forces for restoring the original state of the multi-layer block occur therein, and the intensity of forces at the beginning of the development considerably differs from that of forces at the end of the development. As a result, the density of the hexagons developed at the end greatly differs from that of hexagons developed at the beginning. Namely, the density of the hexagons in the disk is not uniform throughout the circumference. For this reason, a conventional speaker diaphragm using such a disk having a honeycomb construction suffers from unflatness in the sound pressure level to frequency characteristic when used in a loudspeaker.

SUMMARY OF THE INVENTION

The present invention has been achieved in order to remove the above-mentioned drawback and disadvantage inherent to conventional method of manufacturing a speaker diaphragm having a disk of honeycomb construction.

It is, therefore, a primary object of the present invention to provide a new method of manufacturing a speaker diaphragm in which an undeveloped multi-layer block is developed into a disk having honeycomb construction, the density of hexagonal sections of which is uniform throughout the circumference of the disk.

Another object of the present invention is to provide such a method so that a diaphragm manufactured by the method is capable of reproducing audio signals with high fidelity.

A further object of the present invention is to provide such a method so that the sound pressure level to frequency characteristic of a loudspeaker comprising a diaphragm manufactured by the method according to the present invention is flat.

A yet further object of the present invention is to provide such a method so that the frequency range of such a speaker is wider than that of conventional speakers.

In accordance with the present invention, there is provided a method of manufacturing a speaker diaphragm from a multi-layer block constructed of a plurality of rectangular thin layers to be developed into a diaphragm core having a honeycomb construction, the multi-layer block having left and right sides respectively corresponding to the outer surface of a first layer and the outer surface of the last layer of the plurality of layers, top and bottom sides respectively corresponding to the opposite edges of the plurality of rectangular thin layers, and front and rear ends respectively corresponding to the remaining edges of the rectangular thin layers, each of the rectangular thin layers being connected to an adjacent layer at a plurality of places by means of adhesive, the adhesive being arranged in the form of parallel strips, and these adhesive strips being substantially parallel with the front and rear ends of the multi-layer block, the method comprising the steps of: (a) developing the multi-layer block into a columnar block in such a manner that the bottom side of the multi-layer block corresponds to the center of the columnar block; (b) connecting the left and right sides to each other by means of adhesive; (c) expanding the front end which corresponds to the bottom of the columnar block radially for obtaining the diaphragm core; and (d) attaching a thin layer to each of the top and bottom of the diaphragm core.

BRIEF DESCRIPTION OF THE DRAWINGS

These and other objects and features of the present invention will become more readily apparent from the following detailed description of the preferred embodiments taken in conjunction with the accompanying drawings in which.

DETAILED DESCRIPTION OF THE PREFERRED EMBODIMENTS

Figure 1:
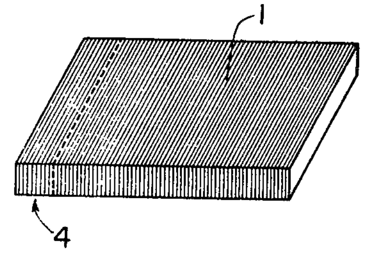
FIG. 1 is a schematic view of a multi-layer material from which a plurality of multi-layer blocks may be cut off.
Figure 3:
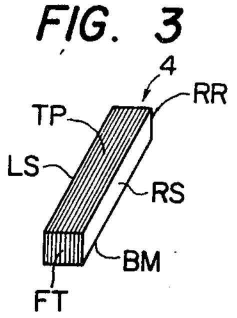
FIG. 3 is a schematic perspective view of a single multi-layer block which is also shown in FIG. 1 and FIG. 2.
Figure 2:
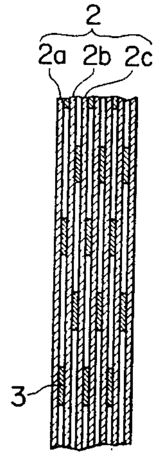
FIG. 2 is an enlarged top view of a single multi-layer block.

Prior to describing the embodiments of the present invention, the conventional manufacturing process for developing an undeveloped multi-layer block will be described hereinafter in order to make the present invention clear. FIG. 1 illustrates a multi-layer material 1 from which a piece of block 4 will be cut off as indicated by a dotted line. The multi-layer block 4 detached from the entire material 1 is shown in FIG. 3. As is well known the multi-layer block 4 has a construction such that a plurality of thin layers 2 (*2a, 2b, 2c* . . . ) made of a light and stiff material, such as aluminum, titanium or the like, is piled up. Adjacent layers 2 are connected to each other at a plurality of places by means of adhesive 3. The multi-layer block 4 of FIG. 3 has a rectangular prism shape since each thin layer 2 is rectangular as illustrated. The rectangular prism of the multi-layer block 4 has a top side TP, a bottom side BM, a right side RS, a left side LS, a front end FT, and a rear end RR. The top and bottom sides TP and BM respectively correspond to the opposite edges of the plurality of rectangular thin layers 2, while the front and rear ends FT and RR respectively correspond to the remaining edges of the plurality of rectangular thin layers 2. FIG. 2 is an enlarged top view of the multi-layer block 4, showing a portion of the top side TP. The adhesive 3 is placed between two adjacent thin layers 2 at a plurality of places at substantially regular intervals. Namely, the adhesive is arranged in the form of parallel strips, and these adhesive strips are substantially parallel to the front and rear ends FT and RR. The position of the adhesive strips 3 between the first and second thin layers *2a* and *2b* is different from that of the adhesive strips 3 between the second and third layers *2b* and *2c*. Namely, the position of the adhesive strips 3 between two adjacent thin layers differs alternately so as to form a honeycomb construction when developed.

The multi-layer block 4 of FIG. 3 will be referred to as an undeveloped multi-layer block hereinbelow, and this block 4 is used in both the conventional method of developing and the method of the same according to the present invention.

Figure 4:
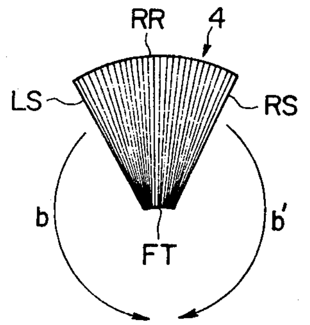
FIG. 4 PRIOR ART
FIGS. 4 to 6 show a prior art technique for developing the multi-layer block of FIG. 3.
Figure 5:
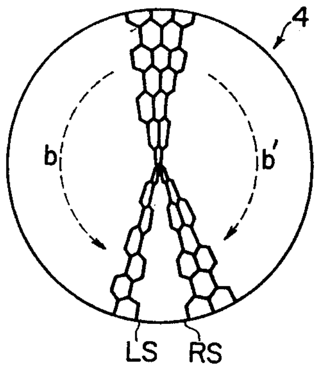
FIG. 5 PRIOR ART
Figure 6:
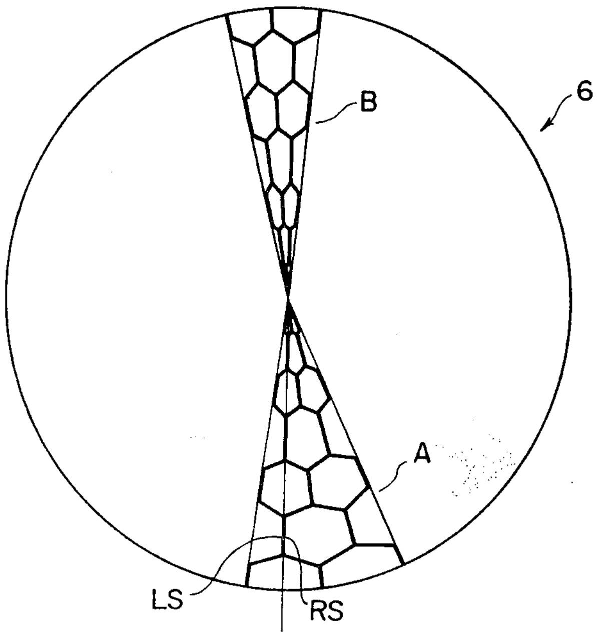
FIG. 6 PRIOR ART
Figure 7:
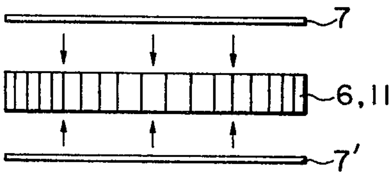
FIG. 7 shows a step of attaching two thin layers respectively to the top and to the bottom of a diaphragm core which is developed in accordance with either a conventional method or the method according to the present invention.

FIG. 4 to FIG. 6 shows the process of development according to the conventional method, and this conventional method will be described with reference to these drawings. The undeveloped multi-layer block of FIG. 3 is readily developed by pulling the both of the left and right sides LS and RS outwardly. In order to form a circular disk which is shown in FIG. 6, pulling forces are given to the both left and right sides LS and RS of the block 4 in curved or circular directions b and b′ as shown in FIG. 4. In other words, the multi-layer block 4 of FIG. 3 is developed into a disk the center of which corresponds to the front side FT as also shown in FIG. 5. After the block 4 has been developed by 360 degrees, the right side RS and the left side LS are connected to each other by suitable adhesive (not shown) as illustrated in FIG. 6. With the above-described process the undeveloped multi-layer block of FIG. 3 can be developed into a disk 6 which may be used as a core of a speaker diaphragm. Two circular sheets 7 and 7′ may be attached to the top and the bottom of the disk or core 6 as shown in FIG. 7, to complete a diaphragm. As shown in FIGS. 5 and 6, as the block 4 is developed into a disk 6, a number of hexagonal sections defined by two adjacent thin layers 2 are made. The size and therefore, the density of these hexagonal sections should be uniform throughout the circumference of the disk 6. However, as shown in FIG. 6 the size at a portion A is greater than that at a portion B. In other words, the density of the hexagonal sections at the portion B is higher than that at the portion A. The reason for this difference or irregularity is that the restoring forces, which occur in the block 4 when the left and right sides LS and RS are pulled, are different in intensity with respect to time in the interval of the development as described hereinbefore.

Figure 8:
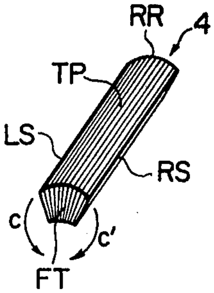
FIGS. 8 to 13 show the steps of developing the multi-layer block of FIG. 3 according to the present invention.
Figure 9:
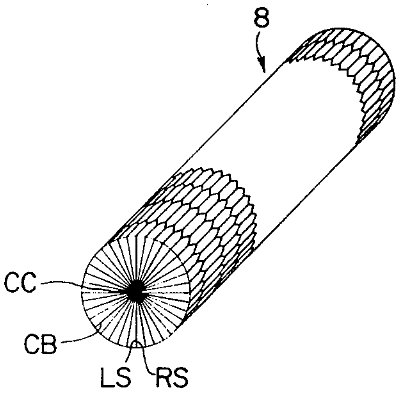

According to the present invention, however, new steps of developing are adopted to uniformly develop the multi-layer block 4 of FIG. 3. These new steps will be described with reference to FIG. 8 to FIG. 13. At the very beginning, the left and right sides LS and RS of the block 4 are pulled in such directions that the bottom side BM of the block 4 corresponds to the center of a column 8 as illustrated in FIGS. 8 and 9. Namely, the block 4 is developed into a column 8 by applying forces the directions of which are indicated by curved lines c and c′. After the block 4 has been completely developed into a column 8, the left and right sides LS and RS are connected to each other by suitable adhesive. The adhesive may be attached to or painted on one of the left and right sides LS and RS prior to developing the block 4 into the column 8. It is to be noted here that the adhesive is not painted on the entire surface of the left or right sides LS or RS; namely, the adhesive is painted at spaced-apart intervals in the longitudinal direction of the left or right side LS or RS so that a plurality of repetitive adhesive bands or strips are formed. The width of each adhesive strip equals that of the adhesive strip 3 shown in FIG. 2, while the distance or space between adjacent adhesive strips on the left or right sides LS or RS also equals the distance between the adjacent adhesive strips in FIG. 2. As seen in FIG. 2, assuming that the width of each adhesive strip 3 is expressed in terms of W, the distance between adjacent adhesive bands 3 is expressed in terms of 3W; namely, the adhesive painted on the left or right side LS or RS of the block 4 has a repetitive pattern where the pitch of the adhesive strips equals three times the width of each of the adhesive strips.

After the block 4 has been developed into a column or cylinder 8 as shown in FIG. 9, the left and right sides LS and RS are connected to each other by means of the adhesive strips painted on the left or right side LS or RS. Since the adhesive on the left or right side LS or RS is painted in the form of repetitive strips with the above-mentioned predetermined pitch, honeycomb structures at the connecting area can take the same shape as that of remaining honeycomb structures in the column 8; namely, all the honeycomb structures on the same cylindrical plane in the column 8 are uniform. Furthermore, the amount of adhesive is uniformly distributed throughout the column 8, without concentrating on the connecting area.

The column 8 of FIG. 9 is not a finished product of a core of a speaker diaphragm, and this column 8 will be referred to as an intermediate product. The column 8 will be further developed by the following step.

Figure 10:
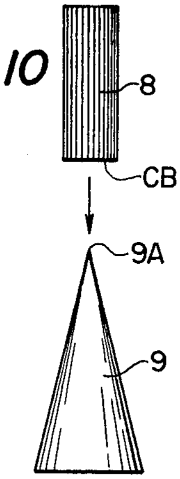
Figure 11:
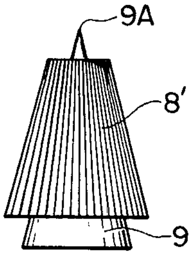

As shown in FIG. 10, the bottom CB of the column 8, which bottom CB corresponds to the front end FT of the rectangular prism shaped block 4 of FIG. 3, is developed by means of a cone shaped tool 9. In detail, the center CC of the bottom CB is engaged with the apex 9A, and the column 8 is downwardly forced so that the cone shaped tool 9 is inserted into the column 8 as implied by an arrow in FIG. 10. The column 8 is depressed further as shown in FIG. 11 so that the apex or tip 9A of the cone shaped tool 9 pass through the longitudinal center line of the column 8. As a result, the column 8 of FIG. 10 takes a form of a truncated cone 8′ as shown in FIG. 11.

Figure 12:
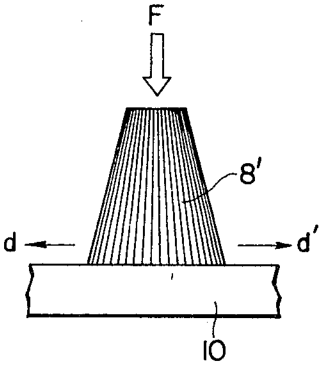
Figure 13:
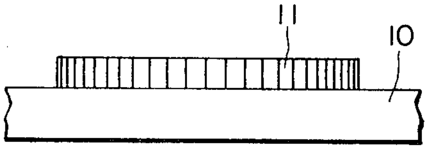

The truncated cone shaped intermediate product 8′ of FIG. 11 will be drawn out from the cone shaped tool 9, and then the truncated cone shaped intermediate product 8′ is put on a flat plate 10 as shown in FIG. 12. After the truncated cone shaped intermediate product 8′ is placed on the flat plate 10, a downward force indicated by an arrow F will be applied to the top portion of the intermediate product 8′. As the force is continuously applied to the top of the truncated cone 8′, the bottom of the truncated cone 8′ will radially expand as indicated by the arrows d and d′ so that we obtain a flat disk 11 as shown in FIG. 13. The flat disk 11 of FIG. 13 will be used as a core of a speaker diaphragm. Namely, two circular sheets or thin layers 7 and 7′ will be respectively attached to the top and the bottom of the flat disk 11 of FIG. 11 as shown in FIG. 7 in the same manner as in the conventional method.

Figure 14:
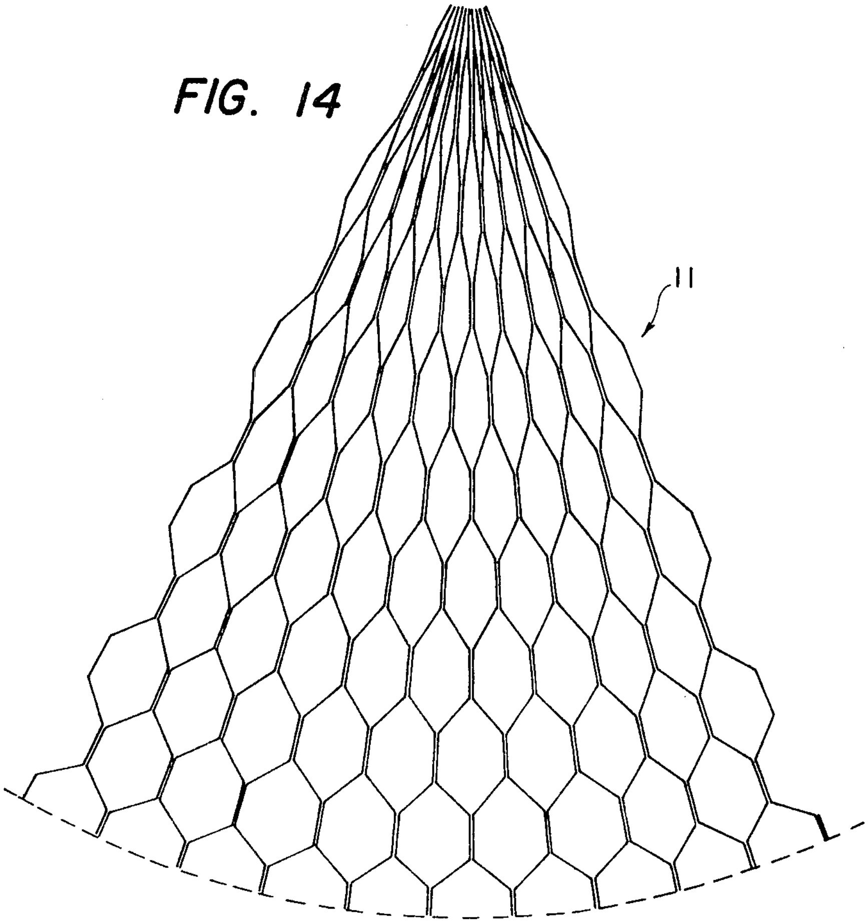
FIG. 14 shows an enlarged view of hexagonal sections in the diaphragm core developed by the method according to the present invention.

FIG. 14 illustrates a portion of the core or the flat disk 11 shown in FIG. 13, which core 11 is manufactured in accordance with the present invention. Since the force F is applied to the truncated cone 8′ vertically, the force F works on this intermediate product 8′ radially and thus uniformly, the truncated cone 8′ can be developed uniformly throughout the entire circumference of the intermediate product 8′.

Although in the embodiment described in the above, the columnar intermediate product 8 of FIG. 9 is developed into a flat disk-shaped core 11 as shown in FIG. 13, the intermediate product 8 does not necessarily have to be developed into such a flat disk. Namely, the force F applied to the top of the truncated cone 8′ may be removed when the truncated cone 8′ is outwardly developed to a desired extent. As a result, a core having a truncated cone shape is produced. The shape of such a core corresponds to that between the shapes of FIG. 12 and FIG. 13.

Furthermore, the application of the force F for outwardly or radially developing the truncated cone 8′ may be omitted. In other words, the intermediate product 8 having a columnar shape as shown in FIG. 10 may be simply developed into a truncated cone 8′ as described in the above, and such a truncated cone 8′ may be used as a core of a speaker diaphragm.

In the above-described embodiments, the columnar intermediate product 8 of FIG. 10 is developed outwardly or radially by means of the cone shaped tool 9. However, there are other possibilities of the ways for radially developing the column 8. For instance, a variable-angle cone shaped tool (not shown) may be used in place of the cone shaped tool 9. The angle of the apex of such a tool is acute when the apex is inserted into the center CC of the bottom CB, and the angle may be gradually increased to outwardly and radially develop the columnar intermediate product 8. When this variable-angle cone shaped tool is used, the application of the force F on the top of the truncated cone 8′ may be omitted.

Figure 15:
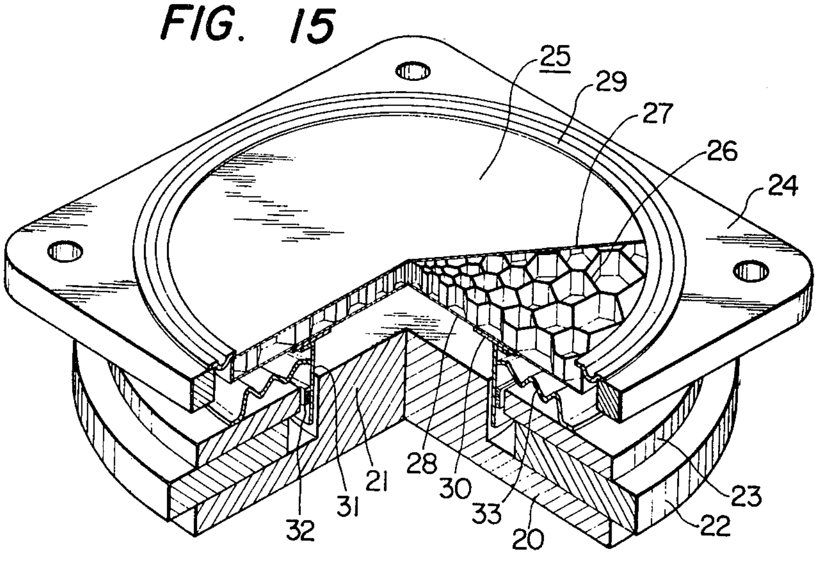
FIG. 15 is a schematic perspective view of a speaker comprising a diaphragm manufactured by the method according to the present invention.

Reference is now made to FIG. 15 which shows a schematical view of a speaker including a diaphragm assembly produced according to the present invention. The speaker comprises an annular yoke 20 having a center pole integrally formed therewith at the top center of the yoke 20, an annular magnet 22 placed on the flange portion of the annular yoke 20, an annular plate 23 placed on the upper surface of the annular magnet 22, a frame 24, a diaphragm assembly 25, and a voice coil assembly (no numeral). The diaphragm assembly 25 comprises a circular core or a disk 26 having a honeycomb construction as described in the above and two thin layers 27 and 28, which are, for instance, made of aluminum sheets, attached to the top and the bottom of the core 26. The diaphragm assembly 25 is inserted in a circular opening made in the frame 24, and is supported by means of an annular rim 26 fixedly connected to the frame 24. The annular magnet 22 is sandwiched between the yoke 20 and the annular plate 23 so that the outer surface of the center pole 21 and the inner surface of the annular plate 23 constitute a magnetic gap therebetween.

The voice coil assembly comprises a voice coil bobbin 31 fixedly connected via a reinforcing ring 30 to the bottom of the diaphragm assembly 25, namely to the lower thin layer 28, and a voice coil 32 wound on the voice coil bobbin 31. A damper 33 is provided between the outer surface of the bobbin 31 and the upper surface of the annular plate 23. The voice coil bobbin 31 is inserted in the space between the center pole 21 and the annular plate 23 so that the voice coil 32 is inserted in the annular magnetic gap. The voice coil is electrically connected to terminals (not shown) by means of suitable connecting leads (not shown) so as to receive a speaker driving signal.

As described hereinbefore, since the forces applied to the undeveloped multi-layer block 4 of FIG. 3 for finally developing the same into a disk or core having a honeycomb construction are uniform throughout the entire circumference of the disk, the density of the hexagonal sections or cells is uniform throughout the entire circumference. Because of this uniformness a node in the standing-wave system of the diaphragm assembly 25 on resonance takes a form of a substantially perfect circle. Therefore, if the diaphragm assembly 25 is driven with the coil bobbin 31 connected to this circular node portion on the lower surface of the diaphragm assembly 25, such resonance phenomenon is prevented from occurring. As a result, the effective frequency range of the speaker can be widened to a frequency at which two of such circular nodes occur, while the frequency to sound pressure level characteristic becomes flat.

From the foregoing, it will be understood that the present invention provides a new and useful method of manufacturing a speaker diaphragm so that a speaker having superior characteristics can be produced. The above-described embodiments are just examples of the method according to the present invention, and therefore, it will be obvious for those skilled in the art that many modifications and variations may be made without departing from the spirit of the instant invention.

We claim:

1. A method of manufacturing a speaker diaphragm from a multi-layer block constructed of a plurality of rectangular thin layers to be developed into a diaphragm core having a honeycomb construction, said multi-layer block having left and right sides respectively corresponding to the outer surface of a first layer and the outer surface of the last layer of said plurality of layers, top and bottom sides respectively corresponding to the opposite edges of said plurality of rectangular thin layers, and front and rear ends respectively corresponding to the remaining edges of said rectangular thin layers, each of said rectangular thin being connected to an adjacent layer at a plurality of places by means of adhesive, said adhesive being arranged in the form of parallel strips, and these adhesive strips being substantially parallel to said front and rear ends of said multi-layer block, said method comprising the steps of:

(a) developing said multi-layer block into a cylindrical block in such a manner that the bottom side of said multi-layer block corresponds to the center of said cylindrical block, walls forming each cell of the honeycomb of the cylinder extending radially of the cylinder;

(b) connecting said left and right sides of each other by means of an adhesive which is painted on one of said left and right sides at spaced-apart intervals so as to form adhesive strips with a predetermined pitch;

(c) expanding said front end which corresponds to the bottom of said cylindrical block radially for obtaining said diaphragm core, said expanding step having the steps of (a) inserting an apex of a cone-shaped tool into the center of said bottom of said cylindrical block for making the shape of said cylindrical block to be a truncated cone;

(b) drawing out said cone-shaped tool from the truncated cone;

(c) further developing said truncated cone into a flat disk, in which said walls forming each of said cells of the honeycomb extend axially of said flat disk, by the steps of (i) placing said truncated cone on a flat plate; and (ii) applying a force at the top of said truncated cone in a direction perpendicular to said flat plate for making the shape of said truncated cone to be a flat disk; and (d) attaching a thin layer to each of the top and bottom of said diaphragm core.

* * * * *